United States Patent

[11] 3,589,754

| [72] | Inventors | Robert W. Randolph<br>St. Charles;<br>Duane V. Thornton, St. Charles; Richard P.<br>Yeates, Bridgeton, all of, Mo. |
|---|---|---|
| [21] | Appl. No. | 851,636 |
| [22] | Filed | Aug. 20, 1969 |
| [45] | Patented | June 29, 1971 |
| [73] | Assignee | ACF Industries, Incorporated<br>New York, N.Y. |

[54] MANUAL KING PIN LOCK FOR A TRAILER HITCH
7 Claims, 11 Drawing Figs.

[52] U.S. Cl. .................................................. 287/20.5
[51] Int. Cl. .................................................. B62d 53/10
[50] Field of Search.......................................... 248/119,
119 S; 287/20, 20.5; 280/433—436, 507—510;
292/3, 47, 48, 52, 202; 105/368 B, 368 S, 366.8

[56] References Cited
UNITED STATES PATENTS

| 1,782,896 | 11/1930 | Hoffman | 292/202 X |
| 1,922,395 | 8/1933 | Reid | 280/435 X |
| 2,619,359 | 11/1952 | Pyle et al. | 280/435 |
| 2,772,895 | 12/1956 | Steeves et al. | 280/435 X |
| 3,251,610 | 5/1966 | Chosy | 280/435 |
| 3,262,402 | 7/1966 | Mowatt-Larsson et al. | 105/368 (S) |
| 3,352,571 | 11/1967 | Nelson | 280/435 |

Primary Examiner—Roy D. Frazier
Attorneys—Samuel J. Snyder and Eugene N. Riddle

ABSTRACT: A tractor-operated hitch for supporting a trailer on a railway car is provided with a manually operated locking device for the trailer kingpin, in addition to the usual kingpin clamping jaws. The locking device includes a shaft or disc rotatable in the bottom portion of the supporting plate of the hitch below the jaws and has a C-shaped rim extending round the bottom of the kingpin. The locking device is turned by a handle so that the rim blocks the opening in the supporting plate through which the kingpin enters and leaves the supporting plate. The handle is arranged so that it can be operated fully only when the jaws are closed and locked, and thus provides a warning if the jaws are not locked closed.

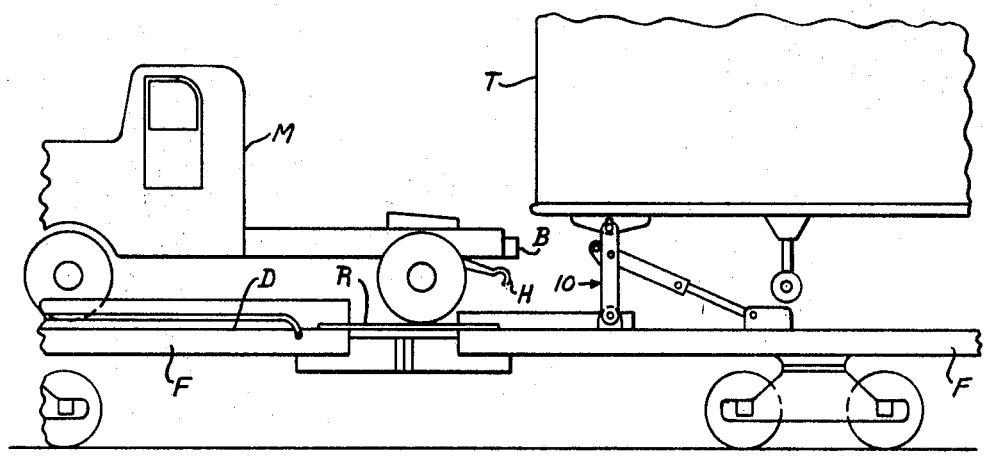
FIG. 1.
PRIOR ART
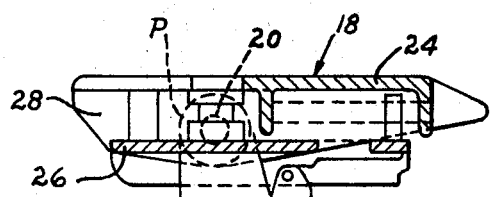
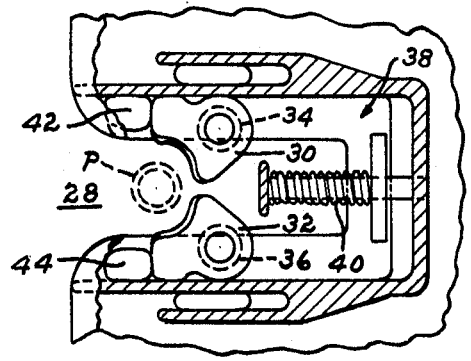
FIG. 4.
PRIOR ART
FIG. 2.
PRIOR ART
INVENTORS.
**ROBERT W. RANDOLPH
DUANE V. THORNTON
RICHARD P. YEATES**
BY
*Samuel J. Snyder*
ATTORNEY

MANUAL KINGPIN LOCK FOR A TRAILER HITCH

BACKGROUND OF THE INVENTION

The invention relates to a trailer hitch, particularly of the type adapted to be knocked down and raised by a trailer tractor. The hitch is provided with jaws for holding the trailer kingpin and mechanism for locking the jaws closed. Since it is obviously extremely important that the hitch be properly locked to the kingpin, the connection therebetween is usually inspected from trackside, but it is difficult, or impossible, actually to see the kingpin. Moreover, there is no safeguard if the kingpin should come free in transit. Accordingly, it is an object of the invention to provide such a safeguard, and also a positive and infallible mechanical determination that the kingpin is properly locked.

SUMMARY OF THE INVENTION

A manual kingpin lock is added to the usual kingpin holding means of a trailer hitch, which may be of the type shown in U.S. Pats. Nos. 3,262,402 and 3,234,893. The manual lock includes a disc of shaft extending through and rotatable in the bottom of the trailer supporting plate of the hitch. The shaft has a C-shaped or arcuate rim at its upper end fitting around the rear of the lower portion of the kingpin, when the latter is locked to the hitch. A handle is connected to the shaft for turning it until the C-shaped rim is in front of the kingpin to prevent it from moving forwardly through the bifurcated supporting plate. The handle includes a bar pivotally connected to an offcenter pin on the shaft, and another pin fixed to the supporting plate and extending through a slot in the rear portion of the bar, so as to permit the bar to be moved longitudinally and also turned. The handle is positioned so that it can be operated to open or close the manual lock only when the usual kingpin-locking means are in their closed position.

BRIEF DESCRIPTION OF THE DRAWING

The invention is disclosed in the accompanying drawing containing the following figures.

FIG. 1 is a fragmentary side elevational view of a trailer secured to a railway flat car by a trailer hitch with a tractor shown for actuating the hitch.

FIG. 2 is a partial side elevational view of a prior art hitch with certain parts broken away and illustrating the locked position of the kingpin-securing means in the erected locked position of the hitch.

FIG. 4 is an enlarged plan view of the supporting plate structure shown in FIG. 3 with certain parts broken away and showing the kingpin-securing means in unlocked position.

DESCRIPTION OF THE PREFERRED EMBODIMENT

Figure 11:
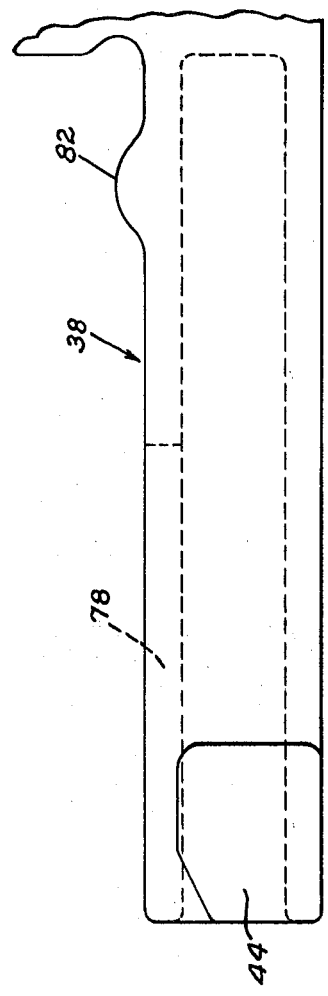
FIG. 11 is a top view of the portion of the leg of the yoke shown in FIGS. 9 and 10.
Figure 10:
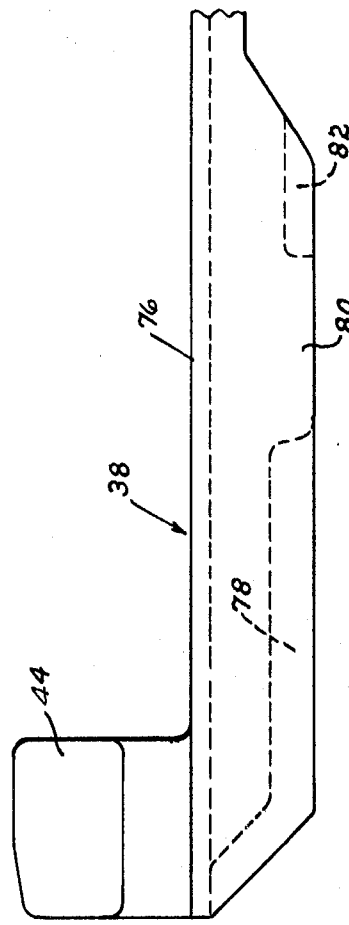
FIG. 10 is a side view of a portion of the leg of the yoke.

The invention is applicable to various types of railway car trailer hitches, one type of which is shown in FIGS. 1 to 4. In these figures railway flat cars F are coupled to each other and their floor or deck plates D are spanned by bridge plates R. A tractor M is supported on bridge plates R when moving from one flat car to another. A trailer T is partially shown in FIG. 1 and a collapsible trailer hitch or support indicated generally at 10 is mounted on flat car F. Trailer T has a kingpin P which is engaged and locked in position to hold the associated trailer in secured position.

Hitch 10 comprises a vertical support member generally designated 12 and a diagonal support member 14 pivotally connected about horizontal pivot 16 to vertical support member 12. A supporting plate structure generally designated 18 is pivotally connected about horizontal pivot 20 to the extending end of vertical support member 12. Hitch 10 is adapted to be pulled from a collapsed position to an erect position by hook H on the rear of tractor M upon forward movement of the tractor. Bumper block B on the rear of tractor M is adapted to knock down hitch 10 to a collapsed position from erect position upon rearward movement of tractor M, and effect unlocking of the trailer kingpin P and unlocking of diagonal support member 14 to permit collapsing of hitch 10.

Figure 3:
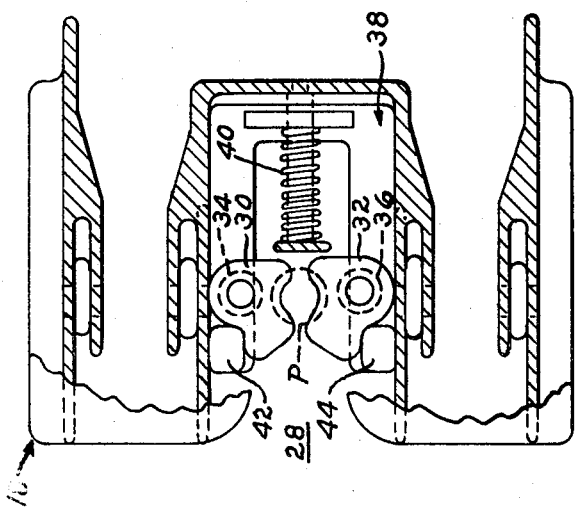
FIG. 3 is an enlarged plan view of the supporting plate structure of the prior art hitch with certain parts broken away and showing means to secure the kingpin of a trailer, the kingpin-securing means being shown in locked position about a kingpin of a trailer.
Figure 9:
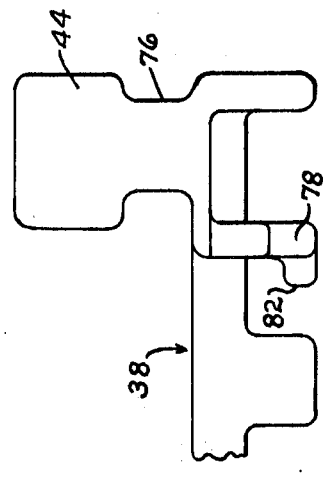
FIG. 9 is an end view of one leg of the yoke.

Support plate 18 has an upper plate 24 and a lower plate 26 and a tapered opening 28 at its forward end through which the kingpin is received as the hitch is raised, or as the trailer T is moved rearwardly. Kingpin P strikes jaws 30, 32, which are normally held open by torsion springs 34, 36, and turns them to their closed positions round the kingpin, as shown in FIG. 3. Yoke 38 is then moved rearwardly by spring 40 until blocks 42, 44 of the yoke engage the backs of jaws 30, 32, as shown in FIG. 3. Jaws 30, 32 are then locked closed and cannot turn to their open positions. The general construction of the hitch as so far described is shown and described in U.S. Pat. No. 3,262,402 and is not part of the present invention.

According to the invention, lower plate portion 26 of supporting plate 18 has a bore 46 and counterbore 48, in which a locking member 50 including a disc-shaped member 51 is rotatably mounted. Member 50 has a rim 52 extending below plate 26 and a ring 54 welded to rim 52. The upper side of disc 51 is provided with a C-shaped or arcuate rim 56, through the open side of which the kingpin may enter. Handle 60 is connected to locking member 50 by bolt 62 extending loosely through handle 60 and threaded into locking member 50. At its rear end handle 60 has a slot 64 terminating in large tapered depressions 65, 66. Bolt 68 extends loosely through slot 64 and is threaded into lower plate portion 26. Spring 70 on bolt 68 is adapted to urge tapered collar or washer 72 into depression 65 or 66 when handle 60 is in its fully open or fully closed position.

Figure 6:
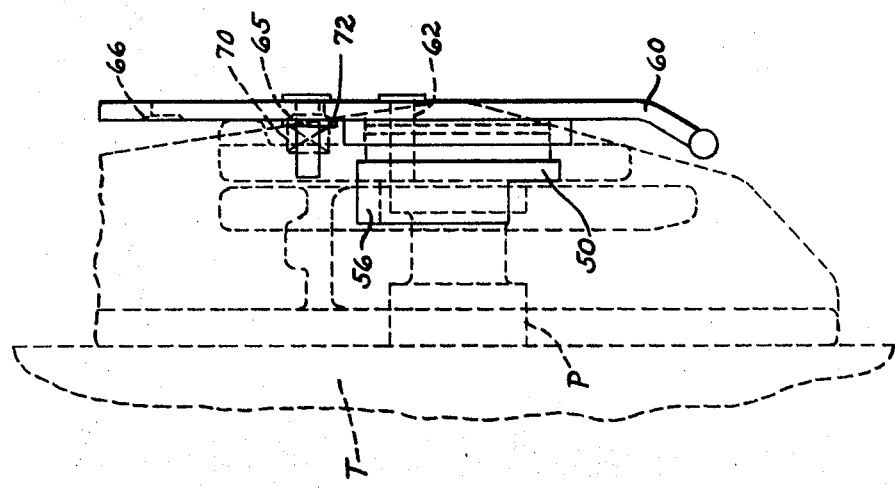
FIG. 6 is a side view of the locking device in its open position, with adjoining structure shown in phantom view.
Figure 5:
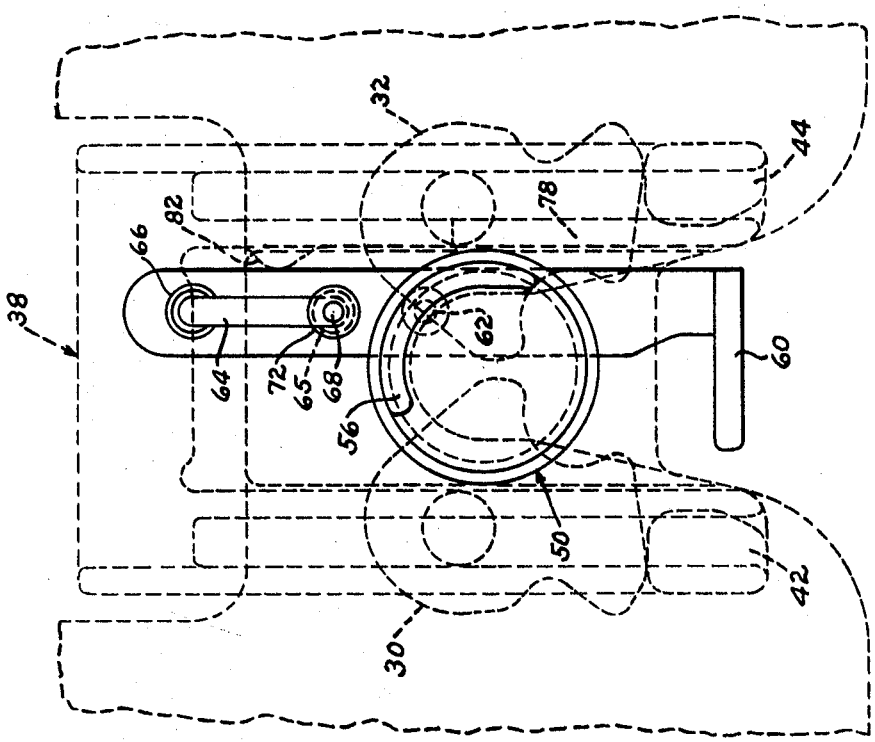
FIG. 5 is a top plan view of the locking device of the invention in its open position, with a portion of the supporting plate structure shown in phantom view.
Figure 8:
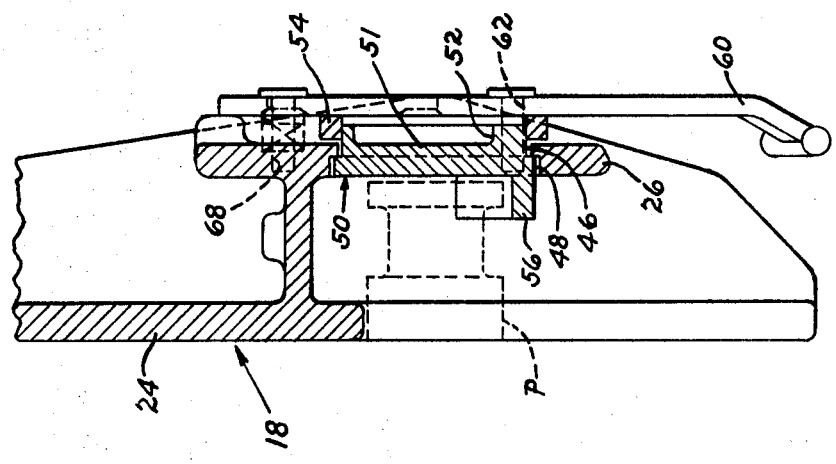
FIG. 8 is a longitudinal section of the supporting plate of the hitch with the locking device of the invention mounted therein and taken generally along line 8-8 of FIG. 7.
Figure 7:
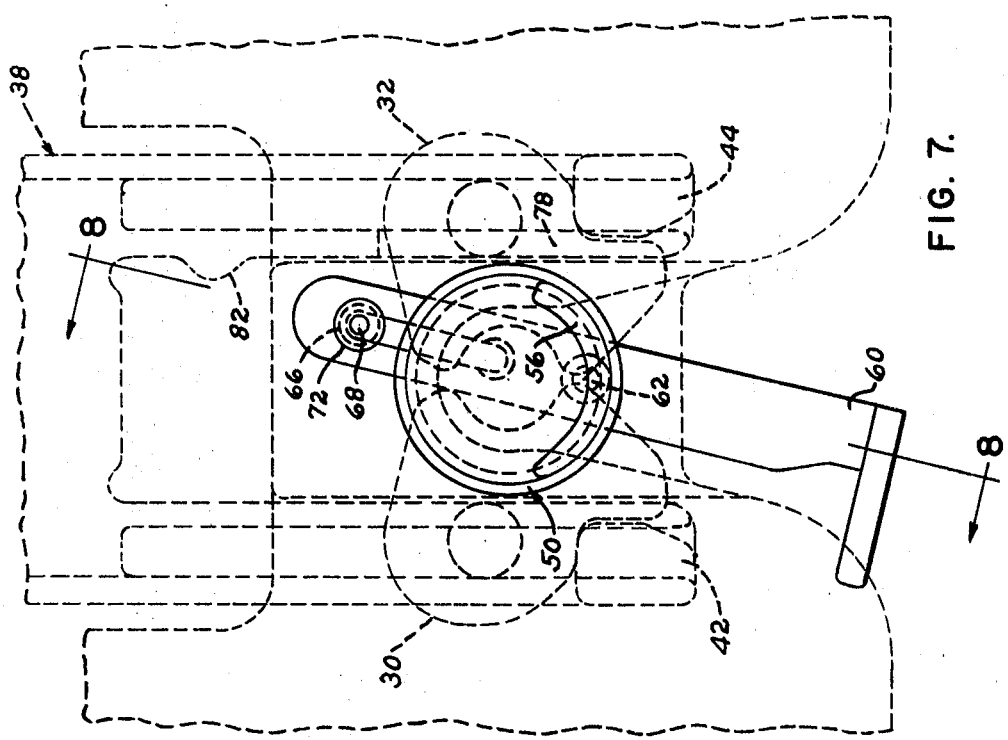
FIG. 7 is a top plan view similar to FIG. 5 of the locking device in its locking position.

When kingpin P is not secured to the trailer hitch, locking member 50 is in its inoperative position, shown in FIGS. 5 and 6. It is evident that to bring locking member 50 to its closed position, handle 60 must be moved forwardly, and during its forward movement it first swings outwardly, to the right, and then inwardly, to the left. However, when jaws 30, 32 are open and yoke 38 is in its forward position, the latter prevents handle 60 from swinging far enough to the right to permit locking device 50 to be closed. The right-hand leg 76 of yoke 38 is undercut at one side as indicated at 78 so that it will not obstruct handle 60 if the yoke is in its retracted or locking position. When yoke 38 is in its forward nonlocking position, portion 80 of leg 76 interferes with movement of handle 60 so as to prevent it from closing locking member 50 if jaws 30, 32 and yoke 38 are not locked. Yoke leg 76 is also provided with a projection 82 adapted to retain handle 60 in longitudinal alignment in the unlocked position of jaws 30, 32, as shown in FIG. 5. It is evident, then, that locking member 50 can be closed or opened only when jaws 30, 32 are closed by the kingpin and locked by lugs 42, 44 of yoke 38. Locking member 50, when closed, prevents the kingpin from moving out of its position in the hitch; and the kingpin, therefore, holds jaws 30, 32 closed, so that if yoke 38 accidentally opens in transit, the yoke can be returned to its locking position by spring 40. The closing of locking member 50 confirms that the hitch is properly locked to the trailer kingpin, and locking member 50 cannot be locked unless the hitch is safely secured to the trailer. Thus, after the trailer is connected to the hitch, when the checker moves handle 60 to its fully closed position, he positively ascertains that the hitch is properly locked to the trailer kingpin. At the same time, the manual lock of the invention prevents jaws 30, 32 from opening if the yoke opens accidentally in transit.

We claim:

1. A truck trailer hitch structure comprising a supporting plate having an opening at one end adapted for receiving the kingpin of the trailer; a pair of complementary pivoted locking jaws on the supporting plate adapted to be engaged by the kingpin and turned into locking position; a locking device on said supporting plate for blocking the opening in said supporting plate for preventing accidental release of the kingpin by the locking jaws; and manually operated means for moving the locking device to and from its blocking position only when the locking jaws are in their locking position; said locking device having a portion journaled in a bottom portion of the supporting plate and a portion extending upwardly adjacent the kingpin, said journaled portion being rotatable substantially about the axis of the kingpin when the kingpin is enclosed within the locking jaws.

2. A trailer hitch according to claim 1, wherein said manual means for moving the locking device includes an elongated member having a handle at its forward end, a pivot connecting an intermediate point of said member to said locking device, and means connecting a rear portion of said member to the bottom portion of the supporting plate for sliding and rotative movement of said elongated member.

3. A trailer hitch according to claim 2, wherein said locking jaws are rotatable about vertical axes; shiftable means for engaging the locking jaws to prevent their rotation out of their locking position, said shiftable means having a portion which moves out of the path of said elongated member when said shiftable means is moved into engagement with the locking jaws, whereby said locking device is movable between its open and close positions only when said shiftable means engages said jaws in their locking position.

4. A trailer hitch according to claim 3, including means for yieldingly resisting movement of said locking device from its fully open and fully closed positions.

5. A trailer hitch according to claim 1, wherein said locking device includes a circular member journaled in said supporting plate below the locking jaws, said circular member having a partial rim extending upwardly therefrom for engaging the lower portion of the kingpin and preventing its movement through the receiving opening of the supporting plate.

6. A trailer hitch according to claim 5, wherein said means for moving the locking device is a lever connected to said locking device below the supporting plate.

7. A trailer hitch according to claim 5, wherein said means for moving the locking device includes a handle connected to the circular member for rotating it.